United States Patent [19]
Noda

[11] Patent Number: 5,150,854
[45] Date of Patent: Sep. 29, 1992

[54] TWO-BEARING REEL PROVIDED WITH ENGAGING MEMBERS FOR SUSPENDER STRAP

[75] Inventor: Hideo Noda, Sakai, Japan

[73] Assignee: Shimano Industrial Co., Ltd., Osaka, Japan

[21] Appl. No.: 529,579

[22] Filed: May 29, 1990

[30] Foreign Application Priority Data

May 29, 1989 [JP] Japan .................. 1-62871[U]

[51] Int. Cl.$^5$ .................................... A01K 89/033
[52] U.S. Cl. ............................ 242/310; 242/316
[58] Field of Search ........... 242/310, 223, 316, 323, 242/312

[56] References Cited

U.S. PATENT DOCUMENTS

| | | | |
|---|---|---|---|
| 2,251,782 | 8/1941 | Coxe | 242/310 X |
| 2,329,982 | 9/1943 | Coxe | 242/310 X |
| 3,478,979 | 11/1969 | Henze | 242/310 X |

FOREIGN PATENT DOCUMENTS 62-64281 4/1987 Japan .

OTHER PUBLICATIONS

"1987 Product Catalog", Daiwa, pp. 26–31, 1986 (publication prior to 1987).

Primary Examiner—Daniel P. Stodola
Assistant Examiner—Tony A. Gayoso
Attorney, Agent, or Firm—Dickstein, Shapiro & Morin

[57] ABSTRACT

A two-bearing reel comprising a reel body formed of a synthetic resin, the reel body including a pair of cylindrical side frames opposed to and spaced from each other, and connecting rods rigidly interconnecting at least lower positions of the side frames, a spool rotatably supported between the side frames and including a pair of flanges opposed to and slightly spaced from inside walls of the side frames, and a pair of engaging members for engaging a suspender strap, the engaging members being arranged at upper positions of the reel body and spaced from each other in the direction in which the side frames are spaced from each other. The reel further comprises an upper connecting rod for rigidly interconnecting upper positions of the side frames, and a bridging member formed of a highly rigid material for covering the upper connecting rod and interconnecting the upper positions of the side frames.

5 Claims, 2 Drawing Sheets

TWO-BEARING REEL PROVIDED WITH ENGAGING MEMBERS FOR SUSPENDER STRAP

BACKGROUND OF THE INVENTION

1. Field of the Invention

The present invention relates to two-bearing reels, and more particularly to a two-bearing reel comprising a reel body formed of a synthetic resin, the reel body including a pair of cylindrical side frames opposed to and spaced from each other, and connecting rods rigidly interconnecting at least lower positions of the side frames, a spool rotatably supported between the side frames and including a pair of flanges opposed to and slightly spaced from inside walls of the side frames, and a pair of engaging members for engaging a suspender strap, the engaging members being arranged at upper positions of the reel body and spaced from each other in the direction in which the side frames are spaced from each other.

2. Description of the Prior Art

Generally, a reel of this type, as shown in Japanese Utility Model Publication Kokai No. 62-64281, comprises an integrated reel body formed of a synthetic resin including a first side frame in the form of a bottomed cylinder, a second side frame in the form of a cylinder, lateral connecting rods rigidly interconnecting lateral positions of the two side frames, and a lower connecting rod rigidly interconnecting lower positions of the side frames. The spool has a pair of flanges whose outer peripheries are opposed to and slightly spaced from inside walls of the side frames, to prevent the fishing line from becoming caught between the outer peripheries of the flanges and the side frames.

The reel having the above construction is generally used, for catching very large fish. Thus, it is necessary for the user to attach one end of a fishing rod to a pole mount secured to the lower connecting rod of the reel body, connect opposite ends of a suspender strap to the respective engaging members, pass the suspender strap around his neck, and hold the fishing rod at an intermediate position.

After forming the reel body of a synthetic resin, the inside walls of the side frames are cut to eliminate distortions of the inside walls and shape the inside walls round, to prevent contact between the inside walls and the outer peripheries of the flanges only slightly spaced therefrom. However, the side frames are interconnected by the connecting rods only at lateral and lower positions, and the second side frame has no bottom. Therefore, the inside wall of the second side frame tends to become greatly distorted as a result of the cutting operation, which increases the possibility of its contacting the outer periphery of one of the flanges formed on the spool.

Further, in the known reel, the engaging members (to which the opposite ends of the suspender strap are connected) are provided on upper positions of the side frames. When the user engages in fishing with the suspender strap passed around the neck and the butt end of a fishing rod held on the abdomen, a great load may act on the engaging members as a result of a large fish taking the bait. This causes the side frames to deform away from each other, whereby the outer peripheries of the flanges formed on the spool may contact the inside walls of the side frames.

SUMMARY OF THE INVENTION

An object of the present invention is to provide a two-bearing reel which, in use, maintains the spacing between the inside walls of the side frames and the outer peripheries of the flanges formed on the spool, and which has a reel body formed of a synthetic resin which is easy to shape for securing the above-mentioned spacing.

In order to achieve the above object, a two-bearing reel according to the present invention comprises an upper connecting rod for rigidly interconnecting upper positions of the side frames, and a bridging member formed of a highly rigid material for covering the upper connecting rod and interconnecting the upper positions of the side frames.

Since, in the above construction, the upper connecting rod is provided for rigidly interconnecting the two side frames at upper positions, distortions due to cutting of the inside wall of the side frames following the reel body formation may be minimized without resorting to a special shaping method for shaping the side frames with increased precision. Consequently, the inside walls of the side frames are maintained out of contact with the outer peripheries of the flanges formed on the spool.

Further, the bridging member (which is formed of a highly rigid material) interconnects the two side frames at upper positions. This bridging member, in use, is capable of bearing great loads acting on the engaging members provided at upper positions of the reel body as are the upper connecting rod. Consequently, the deformation of the side frames occurring while in use may be minimized, such that the outer peripheries of the flanges formed on the spool do not contact the inside walls of the side frames.

In working the present invention, the engaging members are fixed to the bridging member to pass the load acting on the engaging members on to the bridging member, thereby further checking the deformation of the side frames. Where the bridging member is shaped to cover also the lateral surfaces of the upper connecting rod, opposite lateral edges of the upper connecting rod, which may be sharp edges, will not injure the user's fingers since those edges are contained in the bridging member.

Other objects, features and advantages of the present invention will be apparent from the following description of the preferred embodiment.

BRIEF DESCRIPTION OF THE DRAWINGS

The drawings show a two-bearing reel according to the present invention, in which.

DETAILED DESCRIPTION OF THE PREFERRED EMBODIMENT

An embodiment of the present invention will be described hereinafter with reference to the drawings.

Figure 1:
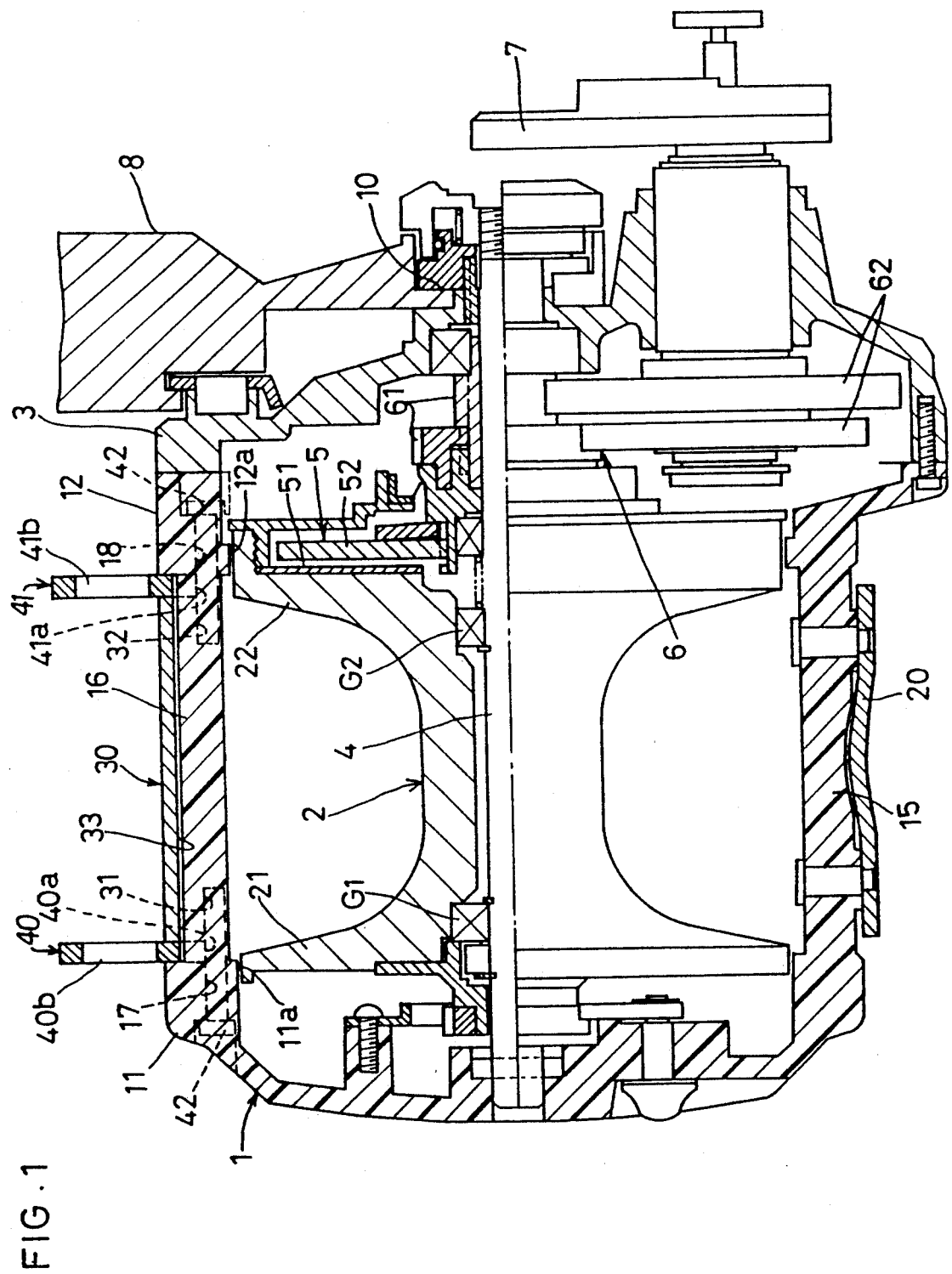
FIG. 1 is a view in vertical section of the reel.

Referring to FIG. 1, a two-bearing reel comprises a reel body 1 including a first side frame 11 and a second side frame 12 opposed to each other with a predetermined spacing therebetween. The first side frame 11 is in the form of a bottomed cylinder. The second side frame 12 is in the form of a cylinder. The side frames 11 and 12 are formed of a synthetic resin and rigidly interconnected at opposed lateral positions by lateral connecting rods 13 and 14 and at opposed lower positions by a lower connecting rod 15, all formed of the synthetic resin. Further, the side frames 11 and 12 are rigidly interconnected at opposed upper positions by an upper connecting rod 16. The upper connecting rod 16 has an upper surface and opposite lateral surfaces covered by a bridging member 30 extending between the two side frames 11 and 12. Engaging members 40 and 41 are provided at opposite ends of the bridging member 30 for engaging opposite ends of a suspender strap. A pole mount 20 is secured to the lower connecting rod 15 of the reel body 1 for supporting a fishing rod.

As shown in FIG. 1, a spool 2 having a pair of flanges 21 and 22 is rotatably supported between the side frames 11 and 12. A bowl-shaped cover 3 is secured to an outer face of the second side frame 12 by mounting screws. A spool shaft 4 is axially movably supported between center positions of the cover 3 and the first side frame 11. The spool 2 is rotatably supported on the spool shaft 4 through a first bearing G1 movable with the spool shaft 4 and a second bearing G2 movable relative to the spool shaft 4. The flanges 21 and 22 are opposed to and slightly spaced from annular inside walls 11a and 12a of the side frames 11 and 12, respectively, to prevent a fishing line wound on the spool 2 from entering the side frames 11 and 12 through the spaces between the flanges 21 and 22 and the annular inside walls 11a and 12a.

As shown in FIG. 1, the second side frame 12 contains a drag mechanism 5 opposed to an end face of the flange 22 and including an annular braking member 51 and a drag disk 52, and a drive mechanism 6 including a pinion gear 61 supported through a bearing to be rotatable relative to the second side frame 12 and spool shaft 4 and a master gear 62 meshed with the pinion gear 61. Drive produced by turning of a handle 7 is transmitted to the spool 2 through the drive mechanism 6 and drag mechanism 5.

As shown in FIG. 1, a drag lever 8 is relatively rotatably supported outside the second side frame 12 for axially shifting the spool shaft 4. The spool shaft 4 carries, at one end thereof, a retainer for retaining the drag lever 8 in position, and a cam 10 disposed between the drag lever 8 and retainer to be movable circumferentially and axially. When the drag lever 8 is turned, the spool shaft 4 is moved axially through the cam 10. The movement of the spool shaft 4 is transmitted through the bearing G1 to the spool 2. Thus the spool 2 is moved with the spool shaft 4 toward the second side frame 12. As a result, the braking member 51 is pressed against the drag disk 52 to apply a predetermined braking force to free rotation of the spool 2.

Figure 2:
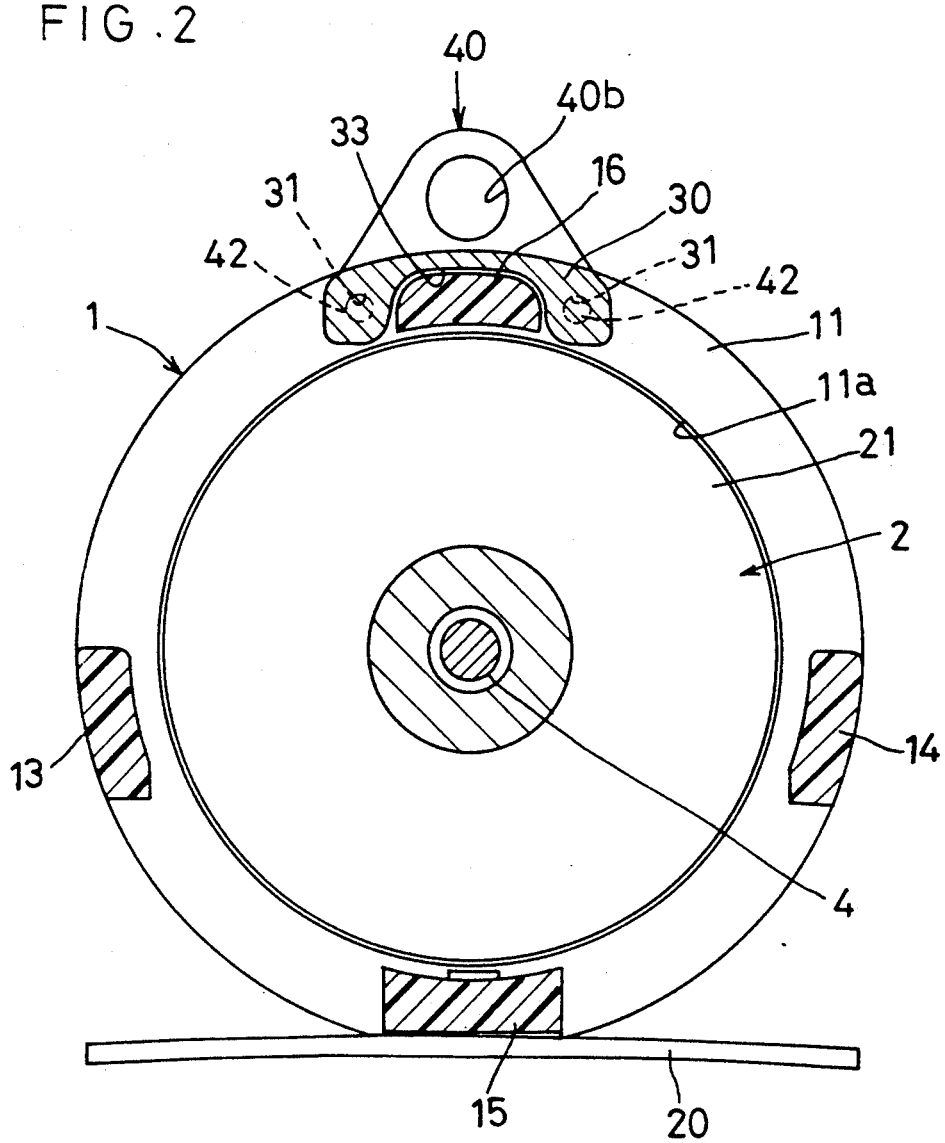
FIG. 2 is a view in cross section of the reel.
Figure 3:
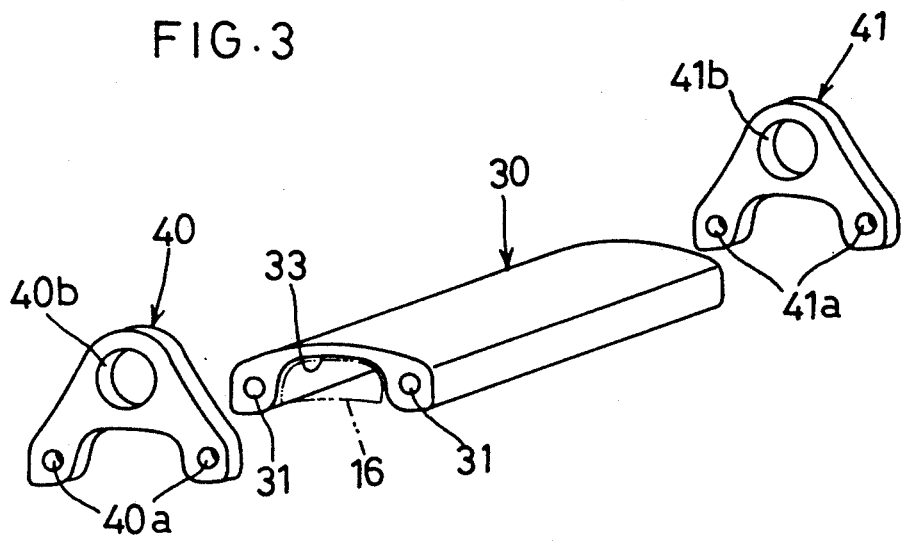
FIG. 3 is a perspective view of a bridging member and engaging members.

As also shown in FIGS. 2 and 3, the bridging member 30 defines threaded holes 31 and 32 in longitudinally opposite ends thereof. The bridging member 30 is formed of a highly rigid material such as aluminum or steel as separate from the engaging members 40 and 41. The engaging members 40 and 41 are in the form of plates defining axial bores 40a and 40b, and engaging bores 40b for engaging the suspender strap. As shown in FIG. 1, the side frames 11 and 12 define stepped perforations 17 and 18 opposed to the threaded bores 31 and 32. The engaging members 40 and 41 and bridging member 30 are secured to the inward walls of the side frames 11 and 12 by mounting screws 42 inserted through the perforations 17 and 18 and axial bores 40a and 41a to be tightened into the threaded bores 31 and 32. A recess 33 extends along the entire length of the bridging member 30. The upper connecting rod 16 is received within the recess and the upper and lateral surfaces of the upper connecting rod 16 are covered by the member 30. The bridging member 30 defines a name plate on an outer surface thereof.

The bridging member 30 has a large width in the circumferential direction of the side frames 11 and 12, and the axial bores 40a and 41a, threaded bores 31 and 32 and perforations 17 and 18 are defined in two positions at each of the opposite ends of the bridging member 30 and spaced apart circumferentially of each of the side frames 11 and 12. According to this construction, the side frames 11 and 12 together have a high rigidity against torsional forces acting circumferentially thereof. Since the engaging members 40 and 41 and bridging member 30 are bolted together, the bridging member 30 counteracts any force for moving the engaging members 40 and 41 away from each other, and checks deformation of the side frames 11 and 12. This is effective to prevent sliding contact between the flanges 21 and 22 and the annular inside walls 11a and 12a of the side frames 11 and 12.

The reel body 1 may be manufactured by using a female die for defining its outer configuration, a cylindrical male die for forming the hollow interior, and appropriate dies for forming the connecting rods 13, 14 and 15. Specifically, the inward surfaces of the lateral connecting rods 13 and 14 may be shaped by using top trimming dies, and the inward surface of the lower connecting rod 15 by using a side trimming die, to be arranged radially outwardly of the annular inside walls 11a and 12a. The inward surface of the upper connecting rod 16 is shaped by using the cylindrical male die. After the forming operation, the inside walls 11a and 12a of the side frames 11 and 12 and the inward surface of the upper connecting rod 16 are cut into shape. In this case, the inward surface of the upper connecting rod 16 is cut so that this inward surface is located radially outwardly of the inside walls 11a and 12a. This form the upper connecting rod 16 along opposite lateral sides thereof. However, the sharp edges of the upper connecting rod 16 will not injure the user's fingers since the upper connecting rod 16 is received in the recess 33 of the bridging member 30 in a manner to contain the sharp edges.

The engaging members 40 and 41 may be formed integrally with the end faces of the bridging member 30 but, whenever possible, should desirably be formed separately therefrom. The engaging members 40 and 41 project outwardly of the reel body 1, and are liable to be damaged through contact with other objects. It is therefore desirable that a damaged engaging member alone is changed without changing the reel body 1 and bridging member 30, to reduce the trouble and cost of repair.

The engaging members 40 and 41 may be fixed to top positions of the side frames 11 and 12 facing away from the bridging member 30, instead of the positions between the opposite ends of the bridging member 30 and the side frames 11 and 12. As long as the engaging members 40 and 41 are fixed adjacent the bridging member 30, loads acting on the engaging members 40 and 41 may be passed on to the bridging member 30.

What is claimed is:

1. A two-bearing reel comprising:
   a reel body (1) formed of a synthetic resin, said reel body (1) including a pair of cylindrical side frames (11, 12) opposed to and spaced from each other, and connecting rods (13, 14, 15, 16) rigidly interconnecting at least upper and lower positions of said side frames (11, 12), said connecting rods comprising an upper connecting rod (16) for rigidly interconnecting said upper positions of said side frames (11, 12), wherein said upper connecting rod (16) has opposite ends, wherein all of said connecting rods (13, 14, 15, 16) are formed of said synthetic resin, and wherein said side frames (11, 12) and said connecting rods (13, 14, 15, 16) are all integrally formed with each other, a spool (2) rotatably supported between said side frames (11, 12) and including a pair of flanges (11a, 12a) opposed to and slightly spaced from inside walls of said side frames (11, 12), a pair of engaging members (40, 41) for engaging a suspender strap, said engaging members (40, 41) being arranged at upper positions of said reel body (1) and spaced from each other in a direction in which said side frames (11, 12) are spaced from each other, and a bridging member (30) formed of a highly rigid material for covering said upper connecting rod (16), for interconnecting the upper positions of said side frames (11, 12) and for reinforcing said engaging members (40, 41) and side frames (11, 12), said bridging member (30) and upper connecting rod (16) being separate elements of said two-bearing reel, wherein said upper connecting rod (16) has opposite lateral surfaces which extend between said side frames (11, 12), wherein said opposite lateral surfaces have sharp edges, and wherein said bridging member (30) covers said sharp edges of said opposite lateral surfaces of said upper connecting rod (16).

2. A two-bearing reel as claimed in claim 1, wherein said bridging member (30) has a large width circumferentially of said side frames (11, 12), and has the opposite ends thereof each connected to one of said side frames (11, 12) by connecting means (42) at least two positions spaced apart circumferentially of said side frames (11, 12).

3. A two-bearing reel as claimed in claim 2, wherein said connecting means comprises bolts extending through said side frames (11, 12) and said engaging members (40, 41) and screwed into the opposite ends of said bridging member (30).

4. A two-bearing reel as claimed in claim 3, wherein said bridging member (30) defines a name plate on an outer surface thereof.

5. A two-bearing reel as claimed in claim 1, wherein said engaging members (40, 41) are formed integrally with said bridging member (30).

* * * * *